United States Patent
Laddha et al.

(10) Patent No.: US 11,250,102 B2
(45) Date of Patent: *Feb. 15, 2022

(54) OPTIMIZING LINEAR PROGRAMMING MODELS USING DIFFERENT SOLVERS

(71) Applicant: SAP SE, Walldorf (DE)

(72) Inventors: Swapnil Laddha, San Francisco, CA (US); Ajay Jose, Sunnyvale, CA (US); Aarathi Vidyasagar, Cupertino, CA (US); Rajendra Vuppala, Dublin, CA (US); Sudhir Bhojwani, Mountain View, CA (US)

(73) Assignee: SAP SE, Walldorf (DE)

( * ) Notice: Subject to any disclaimer, the term of this patent is extended or adjusted under 35 U.S.C. 154(b) by 22 days.

This patent is subject to a terminal disclaimer.

(21) Appl. No.: 16/928,849

(22) Filed: Jul. 14, 2020

(65) Prior Publication Data

US 2020/0342045 A1   Oct. 29, 2020

Related U.S. Application Data

(63) Continuation of application No. 16/201,932, filed on Nov. 27, 2018, now Pat. No. 10,747,842.

(60) Provisional application No. 62/637,791, filed on Mar. 2, 2018.

(51) Int. Cl.
*G06F 17/12*   (2006.01)
*G06Q 10/06*   (2012.01)

(52) U.S. Cl.
CPC ............ *G06F 17/12* (2013.01); *G06Q 10/06* (2013.01)

(58) Field of Classification Search
CPC ...................................................... G06F 17/12
See application file for complete search history.

(56) References Cited

U.S. PATENT DOCUMENTS

| | | | |
|---|---|---|---|
| 6,151,582 A * | 11/2000 | Huang | G06Q 10/06 705/7.25 |
| 2003/0033236 A1 * | 2/2003 | Davenport | G06Q 40/06 705/37 |
| 2003/0078850 A1 | 4/2003 | Hartman et al. | |
| 2012/0253879 A1 | 10/2012 | Santos et al. | |
| 2016/0266930 A1 | 9/2016 | Jones et al. | |
| 2017/0185933 A1 | 6/2017 | Adulyasak et al. | |

* cited by examiner

*Primary Examiner* — Chuong D Ngo
(74) *Attorney, Agent, or Firm* — Fountainhead Law Group P. C.

(57) ABSTRACT

Some embodiments provide a program. The program receives from a client device a sourcing request specifying a plurality of variables comprising set of sources, a set of items, and a set of quantities associated with the items. The program further receives a set of offers from the set of sources. Each offer in the set of offers specifies an item in set of items, a price associated with the item, and a quantity associated with the item. The program also receives a selection of a set of defined scenarios for the sourcing event and the set of offers. The program further generates a set of linear programming models based on the set of defined scenarios the sourcing and the set of offers. The program also instructs solvers to solve the liner programming models.

20 Claims, 6 Drawing Sheets

OPTIMIZING LINEAR PROGRAMMING MODELS USING DIFFERENT SOLVERS

CROSS-REFERENCE TO RELATED APPLICATION

This application is a continuation of U.S. patent application Ser. No. 16/201,932, filed Nov. 27, 2018. The entire contents of U.S. patent application Ser. No. 16/201,932 are incorporated herein by reference in its entirety for all purposes. U.S. patent application Ser. No. 16/201,932 claims the benefit and priority of U.S. Provisional Application No. 62/637,791, filed Mar. 2, 2018, entitled "Optimization Scenario Based on Learning," the entire contents of which are incorporated herein by reference in its entirety for all purposes.

BACKGROUND

Procurement and sourcing are functions that are utilized by many companies and businesses in order to acquire goods and/or services. Some companies or businesses may outsource such functions to a third-party. Other companies or businesses have an internal team of employees that perform procurement and sourcing functions. Such third-parties or internal teams of employees may use a variety of different tools and/or services to perform procurement and sourcing functions. For example, some tools and/or services can include one or more of the following features: selecting suppliers, onboarding suppliers, communicating with suppliers, creating purchase orders, approving purchase orders, tracking the status of purchase orders, managing inventory, managing finances (e.g., billing, payment of goods and/or services, etc.), managing documents, managing budgets, generating reports, etc.

SUMMARY

In some embodiments, a non-transitory machine-readable medium stores a program. The program receives from a client device a request specifying a plurality of variables comprising set of sources and a set of objects. The program further receives a set of values from the set of sources. Each value in the set of values specifies an object in set of objects. The program also receives a selection of a set of defined scenarios for the request and the set of values. The program further generates a set of linear programming models based on the set of defined scenarios, the request, and the set of values. For each linear programming model in the set of linear programming models, the program also performs complexity analysis on the linear programming model, identifies a solver from a plurality of solvers to use on the linear programming model based on the complexity analysis, instructs the identified solver to solve the liner programming model, receives from the identified solver results associated with solving the linear programming model, and provides the results to the client device.

In some embodiments, the program may further identify an outlier value in the set of values and remove the outlier value from the set of values. Generating the set of linear programming models may include generating the set of linear programming models further based on values in the set of values other than the outlier value. Performing the complexity analysis on the linear programming model for each linear programming model in the set of linear programming models may include determining whether a number of variables in the plurality of variables is greater than a defined threshold value, upon determining that the number of variables in the plurality of variables is greater than the defined threshold value, determining that the linear programming model is a complex linear programming model and, upon determining that the number of variables in the plurality of variables is not greater than the defined threshold value, determining that the linear programming model is a non-complex linear programming model.

In some embodiments, identifying the solver from the plurality of solvers to use on the linear programming model based on the complexity analysis for each linear programming model in the set of linear programming models may include, upon determining that the linear programming model is a complex linear programming model, identifying a first solver from the plurality of solvers to use on the linear programming model and, upon determining that the linear programming model is a non-complex linear programming model, identifying a second, different solver from the plurality of solvers to use on the linear programming model. Instructing the identified solver to solve the liner programming model for each linear programming model in the set of linear programming models may include, upon determining that the linear programming model in the set of linear programming models is a non-complex linear programming model, storing the linear programming model in memory of the computing device and instructing the identified solver to solve the linear programming model from the memory and, upon determining that the linear programming model in the set of linear programming models is a complex linear programming model, generating a file configured to store the linear programming model; storing the file in a storage, and instructing the identified solver to solve the linear programming model from the storage.

In some embodiments, the program may further receive a set of constraints for the set of defined scenarios. Generating the set of linear programming models may be further based on the set of constraints. A scenario in the set of scenarios may specify to determine an optimal subset of values from the set of values based on the plurality of variables and the set of values.

In some embodiments, a method, executable by a device, receives from a client device a request specifying a plurality of variables comprising set of sources and a set of objects. The method further receives a set of values from the set of sources. Each value in the set of values specifies an object in set of objects. The method also receives a selection of a set of defined scenarios for the request and the set of values. The method further generates a set of linear programming models based on the set of defined scenarios, the request, and the set of values. For each linear programming model in the set of linear programming models, the method also performs complexity analysis on the linear programming model, identifies a solver from a plurality of solvers to use on the linear programming model based on the complexity analysis, instructs the identified solver to solve the liner programming model, receives from the identified solver results associated with solving the linear programming model, and provides the results to the client device.

In some embodiments, the method may further identify an outlier value in the set of values and remove the outlier value from the set of values. Generating the set of linear programming models may include generating the set of linear programming models further based on values in the set of values other than the outlier value. Performing the complexity analysis on the linear programming model for each linear programming model in the set of linear programming models may include determining whether a number of variables in the plurality of variables is greater than a defined threshold value, upon determining that the number of variables in the plurality of variables is greater than the defined threshold value, determining that the linear programming model is a complex linear programming model, and, upon determining that the number of variables in the plurality of variables is not greater than the defined threshold value, determining that the linear programming model is a non-complex linear programming model.

In some embodiments, identifying the solver from the plurality of solvers to use on the linear programming model based on the complexity analysis for each linear programming model in the set of linear programming models may include, upon determining that the linear programming model is a complex linear programming model, identifying a first solver from the plurality of solvers to use on the linear programming model and, upon determining that the linear programming model is a non-complex linear programming model, identifying a second, different solver from the plurality of solvers to use on the linear programming model. Instructing the identified solver to solve the liner programming model for each linear programming model in the set of linear programming models may include, upon determining that the linear programming model in the set of linear programming models is a non-complex linear programming model, storing the linear programming model in memory of the computing device and instructing the identified solver to solve the linear programming model from the memory and, upon determining that the linear programming model in the set of linear programming models is a complex linear programming model, generating a file configured to store the linear programming model; storing the file in a storage, and instructing the identified solver to solve the linear programming model from the storage.

In some embodiments, the method may further receive a set of constraints for the set of defined scenarios, wherein generating the set of linear programming models is further based on the set of constraints. A scenario in the set of scenarios may specify to determine an optimal subset of values from the set of values based on the plurality of variables and the set of values.

In some embodiments, a system includes a set of processing units and a non-transitory machine-readable medium that stores instructions. The instructions cause at least one processing unit to receive from a client device a request specifying a plurality of variables comprising set of sources and a set of objects. The instructions further cause the at least one processing unit to receive a set of values from the set of sources. Each value in the set of values specifies an object in set of objects. The instructions also cause the at least one processing unit to receive a selection of a set of defined scenarios for the request and the set of values. The instructions further cause the at least one processing unit to generate a set of linear programming models based on the set of defined scenarios, the request, and the set of values. For each linear programming model in the set of linear programming models, the instructions also cause the at least one processing unit to perform complexity analysis on the linear programming model, identify a solver from a plurality of solvers to use on the linear programming model based on the complexity analysis, instruct the identified solver to solve the liner programming model, receive from the identified solver results associated with solving the linear programming model, and provide the results to the client device.

In some embodiments, the instructions may further cause the at least one processing unit to identify an outlier value in the set of values; and remove the outlier value from the set of values. Generating the set of linear programming models may include generating the set of linear programming models further based on values in the set of values other than the outlier value. Performing the complexity analysis on the linear programming model for each linear programming model in the set of linear programming models may include determining whether a number of variables in the plurality of variables is greater than a defined threshold value, upon determining that the number of variables in the plurality of variables is greater than the defined threshold value, determining that the linear programming model is a complex linear programming model, and, upon determining that the number of variables in the plurality of variables is not greater than the defined threshold value, determining that the linear programming model is a non-complex linear programming model.

In some embodiments, identifying the solver from the plurality of solvers to use on the linear programming model based on the complexity analysis for each linear programming model in the set of linear programming models may include, upon determining that the linear programming model is a complex linear programming model, identifying a first solver from the plurality of solvers to use on the linear programming model and, upon determining that the linear programming model is a non-complex linear programming model, identifying a second, different solver from the plurality of solvers to use on the linear programming model. Instructing the identified solver to solve the liner programming model for each linear programming model in the set of linear programming models may include, upon determining that the linear programming model in the set of linear programming models is a non-complex linear programming model, storing the linear programming model in memory of the computing device and instructing the identified solver to solve the linear programming model from the memory and, upon determining that the linear programming model in the set of linear programming models is a complex linear programming model, generating a file configured to store the linear programming model; storing the file in a storage, and instructing the identified solver to solve the linear programming model from the storage. The instructions may further cause the at least one processing unit to receive a set of constraints for the set of defined scenarios, wherein generating the set of linear programming models is further based on the set of constraints.

The following detailed description and accompanying drawings provide a better understanding of the nature and advantages of the present invention.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for optimizing sourcing events using different solvers. In some embodiments, a computing system can provide an application through which a user may create sourcing events. A sourcing event, which may also be referred to as a sourcing request, can specify a set of suppliers, a set of items to be purchased, and quantities for the set of items to be purchased. Once a sourcing event is created, suppliers specified in the sourcing event can submit bids (also referred to as offers) on items specified in the sourcing event. In some embodiments, the application may identify any outlier bids and remove them from the sourcing event. Then, the application sends the sourcing event and several scenarios to an optimization service running on the computing system. The optimization service may use different solvers to provide optimized solutions for the various scenarios of the sourcing event based on a number of different criteria. The optimization service sends the optimized solutions to the application, which sends them to the user that created the sourcing event.

The techniques described herein provide a number of benefits and advantages over conventional methods of managing sourcing events. First, by identifying and removing any outlier bids from a sourcing event, the application is able to streamline the scenarios of the sourcing event. As a result, the footprint that a solver needs to be solving is reduced and the scenarios are able to be processed faster. Second, by using different solvers to provide solutions to different sourcing events, the optimization service can leverage the strengths of different solvers in order to efficiently and quickly process scenarios of sourcing events (as opposed to using a single solver to provide solutions to every sourcing event).

Figure 1:
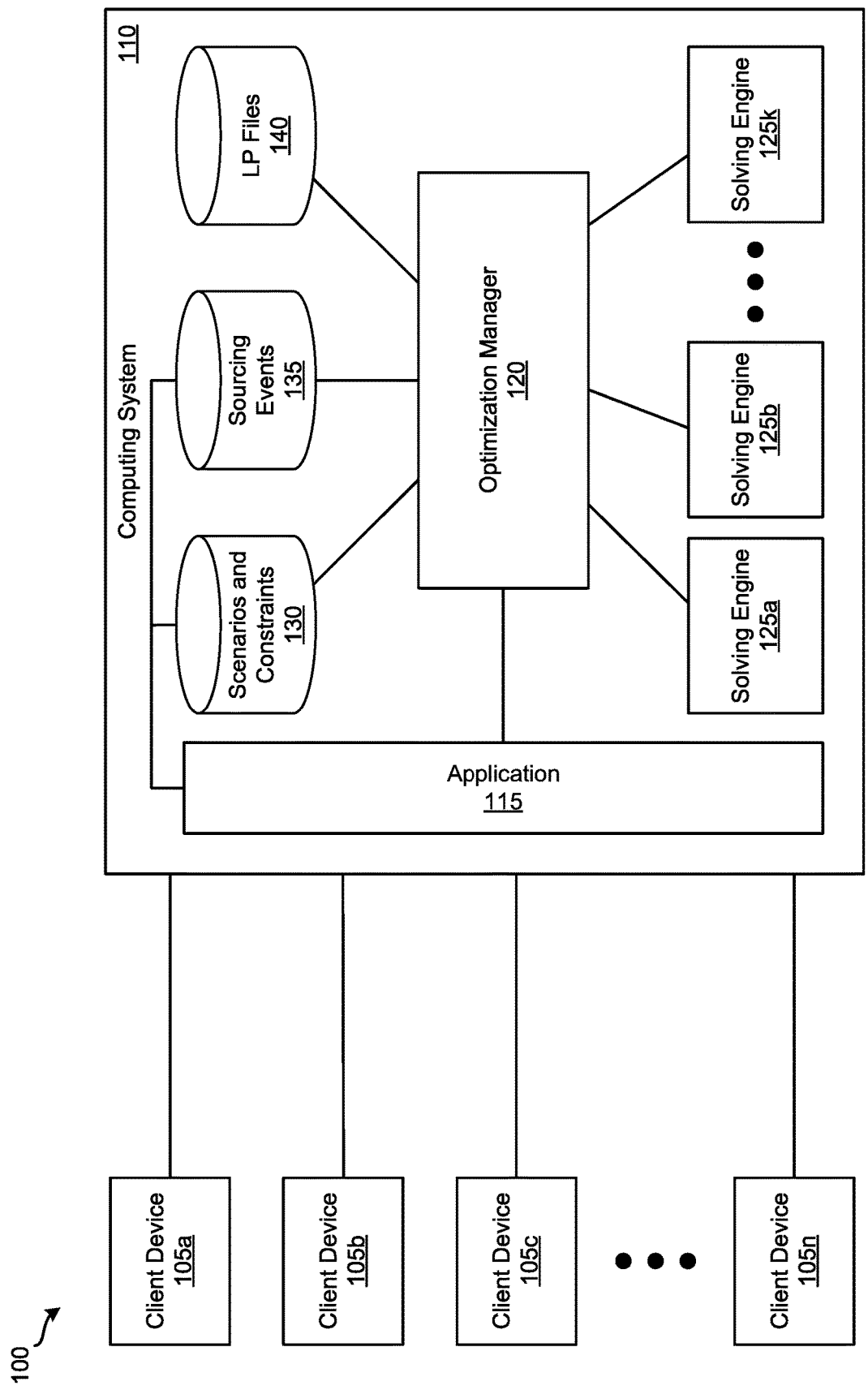
FIG. 1 illustrates a system for optimizing sourcing events according to some embodiments.

FIG. 1 illustrates a system 100 for optimizing sourcing events according to some embodiments. As shown, system 100 includes client devices 105a-n and computing system 110. Each client devices 105 is configured to communicate and interact with computing system 110. For example, a user (e.g., a buyer) of a client device 105 wanting to procure goods or services may access application 115 and create sourcing events via a graphical user interface (GUI) provided by application 115. In some embodiments, a sourcing event may specify a set of suppliers, a set of items to be purchased, and quantities for the set of items to be purchased. Another user (e.g., a supplier) of another client device 105 can access application 115 and send application 115 offers on items specified in sourcing events via a GUI provided by application 115. In some embodiments, an offer specifies an item in the sourcing event, a price associated with the item, and a quantity associated with the item. After receiving offers on items specified in a sourcing event created, the user of client device 105 that created the sourcing event may send application 115 a selection of one or more scenarios for the sourcing event and the received offers and, optionally, one or more constraints for the scenarios. In return, the user of the client device 105 can receive, for each scenario of the sourcing event, an optimized solution for the scenario of the sourcing event or a notification indicating that a solution could not be provided for the scenario of the sourcing event.

As illustrated in FIG. 1, computing system 110 includes application 115, optimization manager 120, solving engines 125a-k, and storages 130-140. Scenarios and constraints storage 130 is configured to store predefined scenarios as well as custom scenarios (e.g., created by users of client devices 105a-n). In some embodiments, a scenario specifies to determine an optimal subset of a set of offers. For example, a scenario may specify to determine an optimal subset (e.g., the lowest total of bid amounts) of a set of offers in a manner that fulfills a specified quantity of each item in a set of items of a sourcing event. As another example, a scenario can specify to determine an optimal subset (e.g., the lowest total of bid amounts) of a set of offers from a select group of suppliers in a manner that fulfills a specified quantity of each item in a set of items of a sourcing event. As yet another example, a scenario can specify to determine an optimal subset (e.g., the lowest total of bid amounts) of a set of offers from a defined number of suppliers in a manner that fulfills a specified quantity of each item in a set of items of a sourcing event. In some embodiments, the scenarios stored in scenarios and constraints storage 130 are reusable and, thus, can be selected by any number of users of client devices 105a-n for sourcing events. Scenarios and constraints storage 130 is also configured to store constraints for scenarios. In some embodiments, a constraint is a condition for a scenario. Examples of constraints may include only suppliers that have been in business for at least a defined number of years can be selected, a defined percentage of offers are required to go to a select group of suppliers, a defined number or percentage of suppliers are required be women-owned suppliers, a defined number or percentage of suppliers are required be minority-owned suppliers, etc. In some embodiments, the constraints stored in scenarios and constraints storage 130 are reusable and, hence, can be added to scenarios by any number of users of client devices 105a-n.

Sourcing events storage 135 stores data associated with sourcing events. As mentioned above, a sourcing event may specify a set of suppliers, a set of items to be purchased, and quantities for the set of items to be purchased. The set of suppliers, the set of items to be purchased, and the quantities for the set of items to be purchased specified by a sourcing event may be stored in sourcing events storage 135. A sourcing event may optionally specify attributes for one or more items in the set of items. For example, for a sourcing event that specifies a set of items to include monitors and laptops, the sourcing event may specify that the monitors have an attribute of a screen size of twenty four inches and the laptops have an attribute of eight gigabytes of random access memory. In addition, sourcing events storage 135 stores offers received from suppliers specified in a sourcing event. Sourcing events storage 135 may store outlier rules for determining outlier offers. In some embodiments, an outlier rule defines a minimum threshold offer value or a maximum threshold offer value. An outlier rule may define a range of offer values.

Linear programming (LP) files storage 140 is configured to store LP files. In some embodiments, a LP file is file configured to store a mathematical representation of a scenario (and any constraints added to the scenario) of a sourcing event and offers received for the sourcing event. An LP model may be used to mathematically represent a scenario of a sourcing event and offers received for the sourcing event. Thus, in some such embodiments, a LP file is configured to store an LP model. An LP model is a mathematical model having requirements represented by linear relationships, in some embodiments. More formally, an LP model is represented by a linear objective function and linear equality and/or linear inequality constraints.

In some embodiments, storages 130-140 are implemented in a single physical storage while, in other embodiments, storages 130-140 may be implemented across several physical storages. While FIG. 1 shows storages 130-140 as part of computing system 110, one of ordinary skill in the art will understand that storage 130, storage 135, and/or storage 140 may be external to computing system 110 in some embodiments.

Application 115 may be a software application operating on (e.g., hosted on) computing system 110 that may be accessed by client devices 105a-n and client device 140. Application 115 may be any number of different types of applications. For instance, application 115 may be an application for managing the procurement and selling of goods and services through a business network, an analytics application, a data management application, a human capital management application, an enterprise management application, a customer relationship management application, a financial management application, etc.

Application 115 is responsible for providing functions associated with sourcing events to client devices 105a-n. For example, application 115 may provide, via a GUI, to client devices 105a-n a tool for creating sourcing events. When application 115 receives a sourcing event from a client device 105 through such a tool, application 115 stores the sourcing event in sourcing events storage 135. Application 115 can also provide, via a GUI, to client devices 105a-n a tool for submitting offers for sourcing events. Upon receiving an offer for a sourcing event from a client device 105, application 115 stores the offer with the sourcing event in sourcing events storage 135. Additionally, application 115 may provide, via a GUI, to client devices 105a-n a tool for selecting scenarios for sourcing events and adding constraints to scenarios of sourcing events. When application 115 receives a request for such a tool from a client device 105, application 115 retrieves defined scenarios and constraints from scenarios and constraints storage 130 and provides them to the client device 105.

Application 115 is also responsible for generating linear programming (LP) models for scenarios of sourcing events. In some embodiments, application 115 first identifies and removes any outlier offers from a sourcing event before generating LP models for scenarios of a sourcing event. For example, after receiving a selection of scenarios for the sourcing event and any constraints for the scenarios, application 115 may determine outlier offers for a sourcing event. To determine outlier offers for a sourcing event, application 115 retrieves the offers associated with the sourcing event and the outlier rules from sourcing events storage 135. Next, application 115 iterates through each outlier rule to identify any offers that violate the outlier rule. For example, if an outlier rule defines a minimum threshold offer value, application 115 identifies any offers associated with the sourcing event having a value that is below the minimum threshold offer value. Similarly, if an outlier rule defines a maximum threshold offer value, application 115 identifies any offers associated with the sourcing event having a value that is above the maximum threshold offer value. In addition, if an outlier rule defines a range of offer values, application 115 identifies any offers associated with the sourcing event having a value that is outside the range of offer values. After iterating through all the outlier rules, application 115 then removes any identified outlier offers from the sourcing event by deleting them from sourcing events storage 135.

Upon removing outlier offers from the sourcing event, application 115 then generates LP models for scenarios of the sourcing event. In some embodiments, application 115 generates an LP model for each selected scenario of the sourcing event. To generate an LP model for a scenario of a sourcing event, application 115 translates the sourcing event and the offers associated with the sourcing event into an LP model. As described above, an LP model is a mathematical model having requirements represented by linear relationships. (e.g., a linear objective function and linear equality and/or linear inequality constraints).

After generating LP models for scenarios of the sourcing event, application 115 performs complexity analysis for the LP models. In some embodiments, application 115 performs complexity analysis for an LP model by examining of the number of items, item attributes, suppliers, or offers associated with the sourcing event from which the LP model is translated. If either the number of items, the number of item attributes, the number of suppliers, or the number of offers is greater than a corresponding, defined threshold value, application 115 determines that the LP model is a complex LP model. That is, if the number of items is greater than a defined threshold value for items, the number of item attributes is greater than a defined threshold value for item attributes, the number of suppliers is greater than a defined threshold value for suppliers, or the number of offers is greater than a defined threshold value for offers, application 115 determines that the LP model is a complex LP model. Otherwise, application 115 determines that the LP model is a non-complex LP model. In some embodiments, application 115 determines that the LP model is a complex LP model when a combination of the number of items, the number of item attributes, the number of suppliers, and/or the number of offers are greater than their respective threshold values. Otherwise, application 115 determines that the LP model is a non-complex LP model. Otherwise, application 115 determines that the LP model is a non-complex LP model. Once application 115 performs complexity analysis for the LP models, application 115 sends the LP models as well as their respective complexity determination to optimization manager 120. In return, application 115 may receive, for each LP model, a solution for the LP model or a notification indicating that a solution could not be provided for the LP model. Application 115 forwards the solutions and/or notifications to the user of the client device 105 that created the sourcing event from which the LP models were generated.

Optimization manager 120 is configured to manage optimizations of LP models. In some embodiments, optimization manager 120 is a service running on computing system 110. In other embodiments, optimization manager 120 is an application running on computing system 110. When optimization manager 120 receives an LP model and a complexity determination for the LP model from application 115, optimization manager 120 determines a solving engine 125a-k to provide a solution for the LP model. For instance, if optimization manager 120 receives from application 115 an LP model and a determination that the LP model is a non-complex LP model, optimization manager 120 may determines that a solving engine using a certain optimization solver (e.g., a CPLEX optimization solver) is to provide a solution for the LP model. Thus, optimization manager 120 sends such a solving engine 125 the LP model and instructs the solving engine 125 to solve the LP model. In some embodiments where the LP is a non-complex LP model, optimization manager 120 also instructs the solving engine 125 to store the LP model in the memory of computing system 110 and solve the LP model while it is stored in the memory of computing system 110. Therefore, in these embodiments, non-complex LP models are optimized in real-time (also referred to as synchronous optimization).

As another example, if optimization manager 120 receives from application 115 an LP model and a determination that the LP model is a complex LP model, optimization manager 120 may determines that another, different solving engine (e.g., a Gurobi optimization solver) is to provide a solution for the LP model. As such, optimization manager 120 sends such a solving engine 125 the LP model and instructs the solving engine 125 to solve the LP model. In some embodiments where the LP is a complex LP model, optimization manager 120 generates an LP file of the LP model and stores it in LP files storage 140 and then instructs the solving engine 125 to solve the LP model from the LP file stored in LP file storage 140. Hence, in these embodiments, complex LP models are optimized in non-real-time (also referred to as asynchronous optimization). Once optimization manager 120 instructs a solving engine 125 to provide a solution for an LP model, optimization manager 120 may receive from the solving engine 125 a solution for the LP model or a notification indicating that the solving engine 125 is unable to provide a solution for the LP model. Optimization manager 120 forwards the solution for the LP model or the notification to application 115.

Solving engines 125a-k are each configured to provide solutions to LP models. A solving engine 125 may receive from optimization manager 120 an LP model and a request to provide a solution to the LP model. In response, the solving engine 125 attempts to solve the LP model. As explained above, an LP model is, in some embodiments, a mathematical model having requirements represented by linear relationships. In some embodiments, a solving engine 125a-k solves an LP model by determining an optimal outcome of the mathematical model. For instance, an LP model of a sourcing event with a scenario that specifies to determine an optimal subset of a set of offers in a manner that fulfills a specified quantity of each item in a set of items of a sourcing event may determine the lowest total of bid amounts as the optimal outcome of the mathematical model representing the scenario of the sourcing event. If the solving engine 125 is able to generate a solution for the LP model, the solving engine 125 sends it to optimization manager 120. Otherwise, the solving engine 125 sends optimization engine 125 a notification indicating that the solving engine 125 is unable to provide a solution for the LP model.

In some instances, a solving engine 125 can receive from optimization manager 120 a request to store the LP model in the memory of computing system 110 and solve the LP model while it is stored in the memory of computing system 110. In response, the solving engine 125 stores the LP model in the memory of computing system 110 (if it is not already stored in the memory of computing system 110) and attempts to solve the LP model from the memory. In other instances, a solving engine 125 may receive from optimization manager 120 a request to solve the LP model from the LP file stored in LP file storage 140. In response, the solving engine 125 attempts to solve the LP model by iteratively reading from LP files storage 140 portions of the LP file storing the LP model as the solving engine 125 is solving the LP model.

Different solving engines 125a-k employ different solvers to solve LP models. Examples of solvers include a CPLEX optimization solver, a Gurobi optimization solver, a LINDO optimization solver, a MOSEK optimization solver, a GNU Linear Programming Kit (GLPK) optimization solver, etc. One of ordinary skill in the art will appreciate that any number of different solvers configured to solve LP models may be utilized in solving engines 125a-k in some embodiments.

Figure 2:
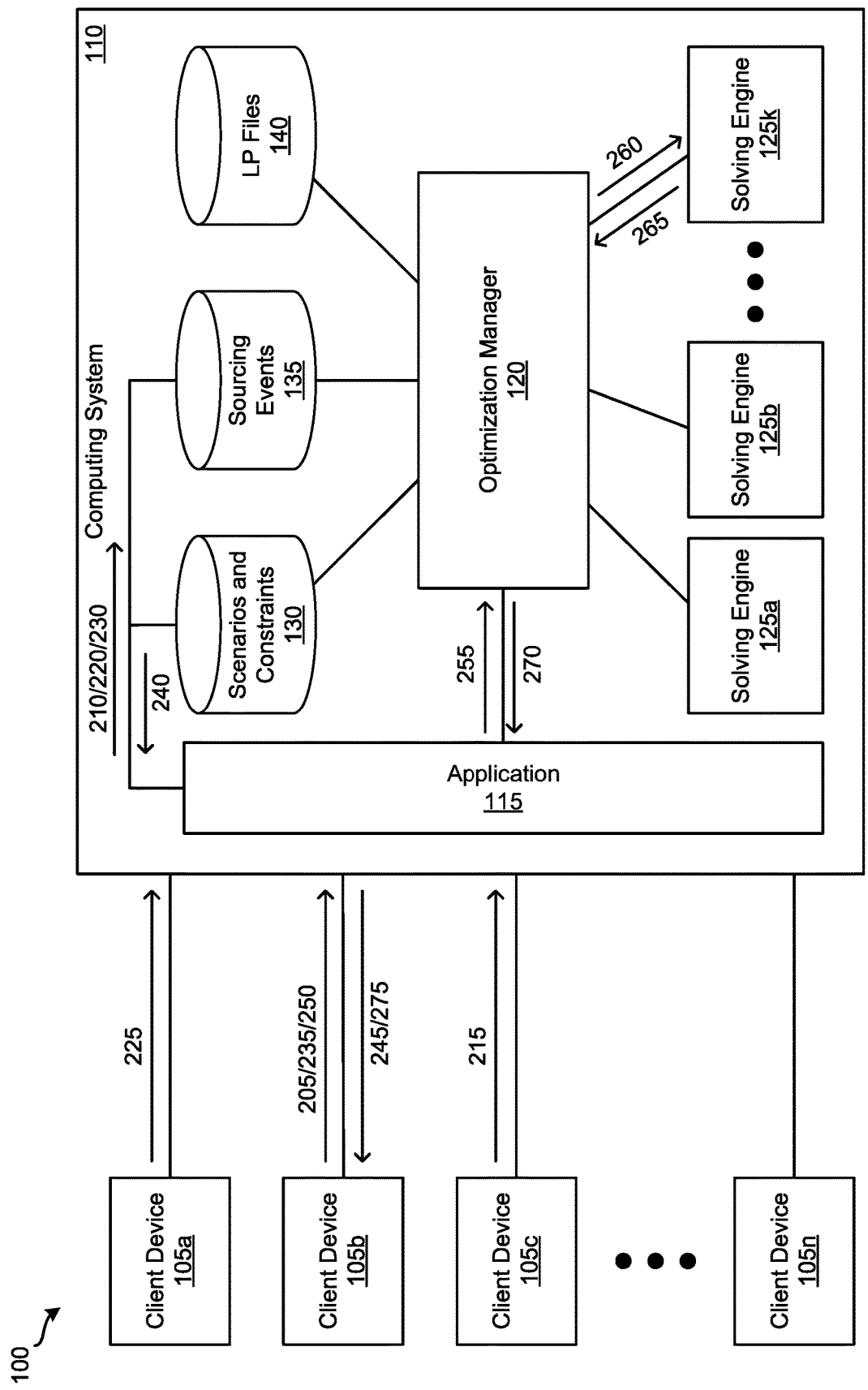
FIG. 2 illustrates a data flow through the system illustrated in FIG. 1 according to some embodiments.

An example operation of system 100 will now be described by reference to FIG. 2, which illustrates a data flow through system 100 according to some embodiments. Specifically, the example operation is of optimizing a sourcing event. The example operation begins by a user of client device 105b accessing application 115 and creating a sourcing event using a tool provided by application 110 through a GUI. In this example, the user of client device 105b is a buyer is part of a business network (not shown). The sourcing event created by the user of client device 105b specifies two suppliers, a set of items that the user would like to purchase, and quantities for the set of items to be purchased. Once the user of the client device 105b has created the sourcing event, client device 105b sends, at 205, the sourcing event to application 115. Upon receiving the sourcing event, application 115 stores, at 210, the sourcing event in sourcing events storage 135 and publishes the sourcing event to the business network. In this example, the two suppliers specified in the sourcing event belong to the business network and, thus, will receive notifications of the creation of the sourcing event.

Next, a user of client device 105c, which is one of the suppliers specified in the sourcing event, accesses application 115 and submits, at 215, offers for the items specified in the sourcing event using a tool provided by application 110 through a GUI. In response, application 115 stores, at 220, the offers with the sourcing event in sourcing events storage 135. Then, a user of client device 105a, which is the other supplier specified in the sourcing event, accesses application 115 and submits, at 225, offers for the items specified in the sourcing event using a tool provided by application 110 through a GUI. Upon receiving the offers, application 115 stores, at 230, the offers with the sourcing event in sourcing events storage 135.

The user of client device 105b then sends, at 235 application 115 a request for a tool for selecting a tool for selecting scenarios for the sourcing event and adding constraints to scenarios of the sourcing event. In response to the request, application 115 retrieves, at 240, the scenarios and constraints stored in scenarios and constraints storage 130 and provides, at 245, them to client device 105b via the requested tool. The user of client device 105b then selects a set of scenarios for the sourcing event and sends, at 250, the selections to application 115. When application 115 receives the selections, application 115 identifies and removes any outlier offers from the sourcing event retrieving the offers associated with the sourcing event and the outlier rules from sourcing events storage 135. Then, application 115 iterates through each outlier rule to identify any offers that violate the outlier rule. Once application has iterated through all the outlier rules, application 115 then removes any identified outlier offers from the sourcing event by deleting them from sourcing events storage 135.

Next, application 115 generates LP models for the selected scenarios of the sourcing event by translating, for each selected scenario of the sourcing event, the sourcing event and the offers associated with the sourcing event into an LP model. Then, application 115 performs complexity analysis for the LP models by examining of the number of items, item attributes, suppliers, or offers associated with the sourcing event. If either the number of items, the number of item attributes, the number of suppliers, or the number of offers is greater than a corresponding, defined threshold value, application 115 determines that the LP models are complex LP models. Otherwise, application 115 determines that the LP models are non-complex LP models. In this example, application 115 determines that the LP models are non-complex models because none of the number of items, the number of item attributes, the number of suppliers, or the number of offers are greater than their corresponding, defined threshold values.

After performing complexity analysis for the LP models, application 115 sends, at 255, the LP models as well as their respective complexity determination to optimization manager 120. Upon receiving the LP models and the complexity determinations for the LP models, optimization manager 120 determines a solving engine 125a-k to provide a solution for the LP models. Since the LP models are non-complex LP models, optimization manager 120 determines solving engine 125k is to provide solutions for the LP models. Thus, optimization manager 120 sends, at 260, the LP models to solving engine 125k and instructs the solving engine 125k to solve the LP models. For this example, optimization manager 120 also instructs the solving engine 125k to store the LP models in the memory of computing system 110 and solve the LP models while it is stored in the memory of computing system 110. In response, solving engine 125k attempts to solve the LP models by storing the LP models in the memory of computing system 110 and solving them while they are stored in the memory of computing system 110. In this example, solving engine 125k is able to solve the LP models so solving engine 125k sends, at 265, the solutions to the LP models to optimization manager 120, which forwards, at 270, them to application 115. Upon receiving the solutions for the LP models, application 115 forwards, at 275, them to client device 105b to provide to the user of client device 105b.

Figure 3:
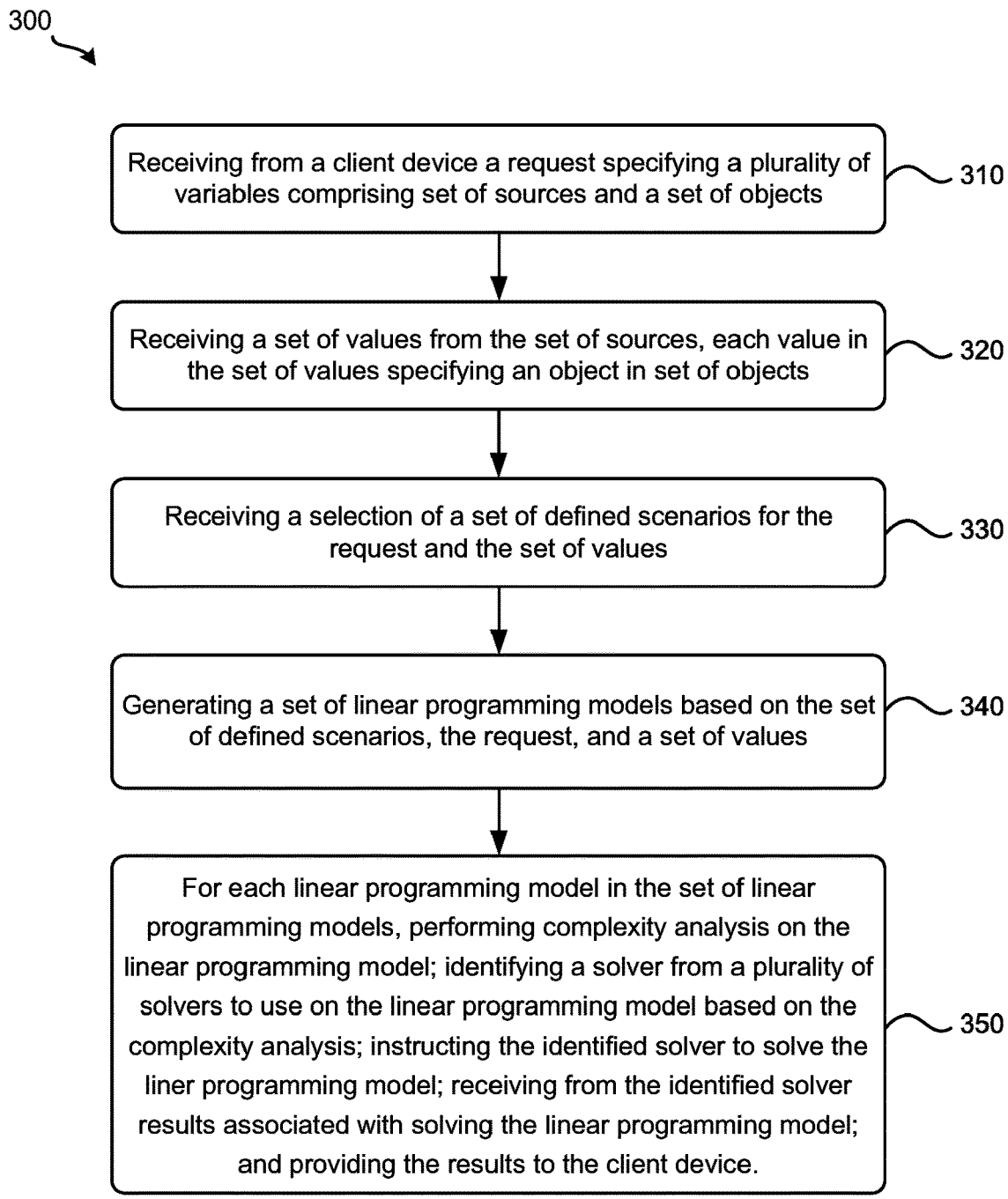
FIG. 3 illustrates a process for optimizing a sourcing event according to some embodiments.

FIG. 3 illustrates a process 300 for optimizing a sourcing event according to some embodiments. In some embodiments, computing system 110 performs process 300. Process 300 starts by receiving, at 310, from a client device a request specifying a plurality of variables comprising set of sources and a set of objects. Referring to FIGS. 1 and 2 as an example, application 115 may receive from a user of client device 105b a request (e.g., a request for a sourcing event) specifying a plurality of variables comprising set of sources (e.g., a set of suppliers), a set of objects (e.g., a set of items), and a set of quantities associated with the objects. In some instances, the request may further specify a set of quantities associated with the objects. The user of client device 105b can send the request to application 115 using a tool provided by application 115 through a GUI.

Next, process 300 receives, at 320, a set of values from the set of sources. Each value in the set of values specifies an object in set of objects. Referring to FIGS. 1 and 2 as an example, application 115 may receive values (e.g., price offers on items in the sourcing event) from a user of client device 105c. Similarly, application 115 can also receive values (e.g., price offers on items in the sourcing event) from a user of client device 105a. The users of client devices 105a and 105c can send the values to application 115 using a tool provided by application 115 through a GUI. In some cases, may also specify a quantity associated with the object. Process 300 then receives, at 330, a selection of a set of defined scenarios for the request and the set of values. Referring to FIGS. 1 and 2 as an example, application 115 may receive from the user of client device 105b a selection of scenarios stored in scenarios and constraints storage 130a using a tool provided by application 115 through a GUI.

After receiving the selection, process 300 generates, at 340, a set of linear programming models based on the set of defined scenarios, the request, and the set of values. Referring to FIGS. 1 and 2 as an example, application 115 generates LP models for the selected scenarios of the sourcing event by translating, for each selected scenario of the sourcing event, the sourcing event and the offers associated with the sourcing event into an LP model.

Finally, at 350, for each linear programming model in the set of linear programming models, process 300 performs complexity analysis on the linear programming model, identifies a solver from a plurality of solvers to use on the linear programming model based on the complexity analysis, instructs the identified solver to solve the liner programming model; receives from the identified solver results associated with solving the linear programming model; and provides the results to the client device. Referring to FIGS. 1 and 2 as an example, application 115 performs complexity analysis for each of the LP models by examining of the number of items, item attributes, suppliers, or offers associated with the sourcing event. If either the number of items, the number of item attributes, the number of suppliers, or the number of offers is greater than a corresponding, defined threshold value, application 115 determines that the LP models are complex LP models. Otherwise, application 115 determines that the LP models are non-complex LP models. Application 115 sends the LP models and their respective complexity determination to optimization manager 120. When optimization manager 120 receives the LP models and the complexity determinations for the LP models, optimization manager 120 determines a solving engine 125a-k to provide a solution for each of the LP models. Optimization manager 120 sends each LP model to its determined solving engine 125 and instructs the solving engine 125k to solve the LP models. The solving engines 125 solve their respective LP models sends the solutions to the LP models to optimization manager 120. In turn, optimization manager 120 sends the solutions to the LP models to application 115, which forwards them to client device 105b to provide to the user of client device 105b.

The examples and embodiments described above by reference to FIGS. 1-3 illustrate details about optimizing a sourcing event after suppliers specified in the sourcing event submit offers for items specified in the sourcing event. In some instances, computing system 110 optimizes the sourcing event even though offers have not been received from every supplier specified in the sourcing event (e.g., optimize the sourcing event after a defined amount of time has elapsed since the creation of the sourcing event). After the sourcing event is optimized, application 115 may receive offers from suppliers specified in the sourcing event that did not previously submit offers or receive modifications to existing offers from suppliers that previously submitted offers. In either case, computing system 110 may re-run the optimization of the sourcing event. In other words, computing system 110 performs the same or similar operations described above by reference to FIGS. 1-3 using, in the former case, the previously submitted offers and the new offers received from suppliers that previously submitted offers or using, in the latter case, the modified offers and the previously submitted offers that were not modified.

Figure 4:
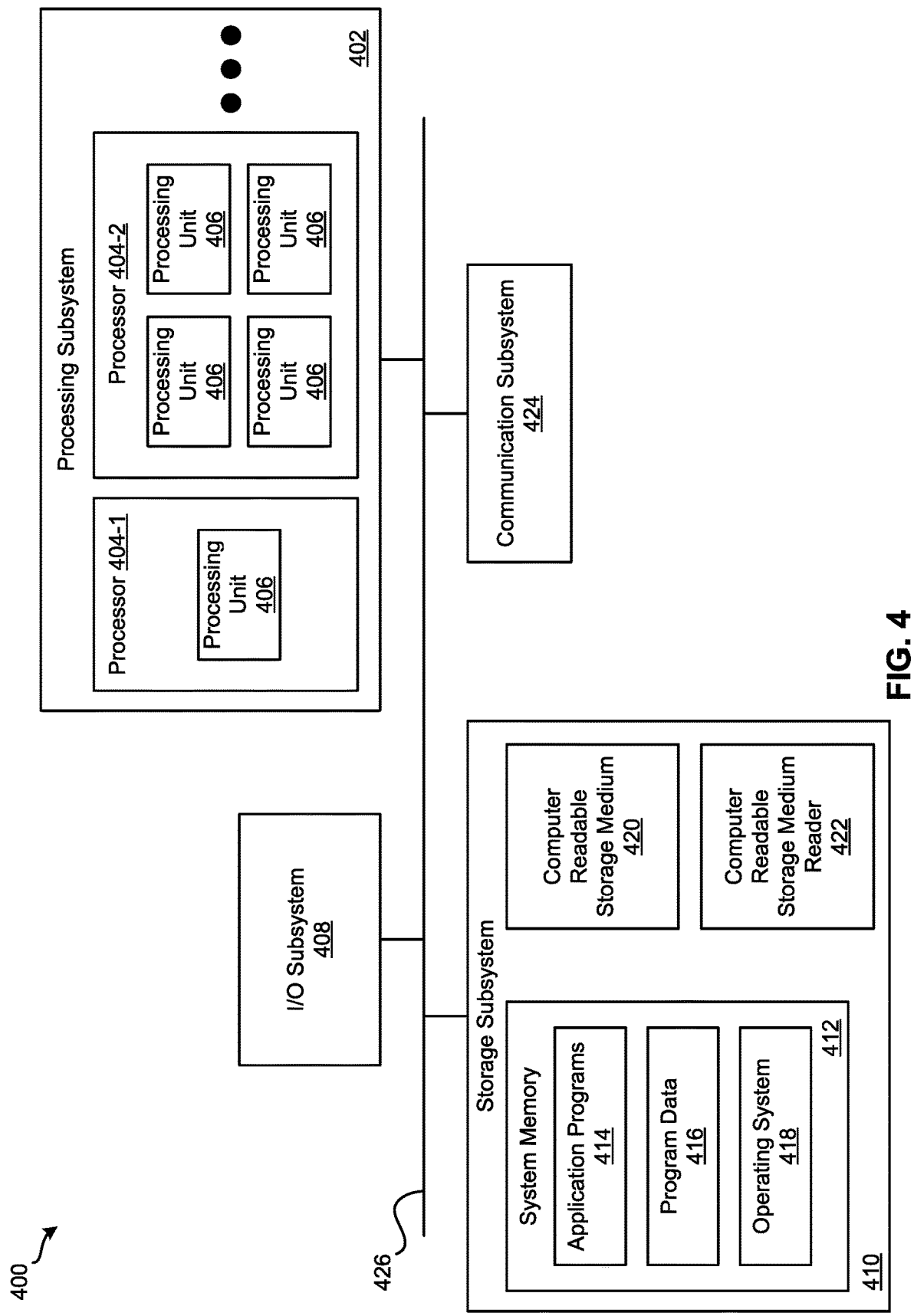
FIG. 4 illustrates an exemplary computer system, in which various embodiments may be implemented.

FIG. 4 illustrates an exemplary computer system 400 for implementing various embodiments described above. For example, computer system 400 may be used to implement client devices 105a-n and computing system 110. Computer system 400 may be a desktop computer, a laptop, a server computer, or any other type of computer system or combination thereof. Some or all elements of application 115, optimization manager 120, solving engines 125*a-k*, or combinations thereof can be included or implemented in computer system 400. In addition, computer system 400 can implement many of the operations, methods, and/or processes described above (e.g., process 300). As shown in FIG. 4, computer system 400 includes processing subsystem 402, which communicates, via bus subsystem 426, with input/output (I/O) subsystem 408, storage subsystem 410 and communication subsystem 424.

Bus subsystem 426 is configured to facilitate communication among the various components and subsystems of computer system 400. While bus subsystem 426 is illustrated in FIG. 4 as a single bus, one of ordinary skill in the art will understand that bus subsystem 426 may be implemented as multiple buses. Bus subsystem 426 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 402, which can be implemented as one or more integrated circuits (e.g., a conventional microprocessor or microcontroller), controls the operation of computer system 400. Processing subsystem 402 may include one or more processors 404. Each processor 404 may include one processing unit 406 (e.g., a single core processor such as processor 404-1) or several processing units 406 (e.g., a multicore processor such as processor 404-2). In some embodiments, processors 404 of processing subsystem 402 may be implemented as independent processors while, in other embodiments, processors 404 of processing subsystem 402 may be implemented as multiple processors integrate into a single chip or multiple chips. Still, in some embodiments, processors 404 of processing subsystem 402 may be implemented as a combination of independent processors and multiple processors integrated into a single chip or multiple chips.

In some embodiments, processing subsystem 402 can execute a variety of programs or processes in response to program code and can maintain multiple concurrently executing programs or processes. At any given time, some or all of the program code to be executed can reside in processing subsystem 402 and/or in storage subsystem 410. Through suitable programming, processing subsystem 402 can provide various functionalities, such as the functionalities described above by reference to process 300, etc.

I/O subsystem 408 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 400 to a user or another device (e.g., a printer).

As illustrated in FIG. 4, storage subsystem 410 includes system memory 412, computer-readable storage medium 420, and computer-readable storage medium reader 422. System memory 412 may be configured to store software in the form of program instructions that are loadable and executable by processing subsystem 402 as well as data generated during the execution of program instructions. In some embodiments, system memory 412 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 412 may include different types of memory, such as static random access memory (SRAM) and/or dynamic random access memory (DRAM). System memory 412 may include a basic input/output system (BIOS), in some embodiments, that is configured to store basic routines to facilitate transferring information between elements within computer system 400 (e.g., during start-up). Such a BIOS may be stored in ROM (e.g., a ROM chip), flash memory, or any other type of memory that may be configured to store the BIOS.

As shown in FIG. 4, system memory 412 includes application programs 414 (e.g., application 115), program data 416, and operating system (OS) 418. OS 418 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 420 may be a non-transitory computer-readable medium configured to store software (e.g., programs, code modules, data constructs, instructions, etc.). Many of the components (e.g., application 115, optimization manager 120, and solving engines 125*a-k*) and/or processes (e.g., process 300) described above may be implemented as software that when executed by a processor or processing unit (e.g., a processor or processing unit of processing subsystem 402) performs the operations of such components and/or processes. Storage subsystem 410 may also store data used for, or generated during, the execution of the software.

Storage subsystem 410 may also include computer-readable storage medium reader 422 that is configured to communicate with computer-readable storage medium 420. Together and, optionally, in combination with system memory 412, computer-readable storage medium 420 may comprehensively represent remote, local, fixed, and/or removable storage devices plus storage media for temporarily and/or more permanently containing, storing, transmitting, and retrieving computer-readable information.

Computer-readable storage medium 420 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 424 serves as an interface for receiving data from, and transmitting data to, other devices, computer systems, and networks. For example, communication subsystem 424 may allow computer system 400 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 424 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 424 may provide components configured for wired communication (e.g., Ethernet) in addition to or instead of components configured for wireless communication.

One of ordinary skill in the art will realize that the architecture shown in FIG. 4 is only an example architecture of computer system 400, and that computer system 400 may have additional or fewer components than shown, or a different configuration of components. The various components shown in FIG. 4 may be implemented in hardware, software, firmware or any combination thereof, including one or more signal processing and/or application specific integrated circuits.

Figure 5:
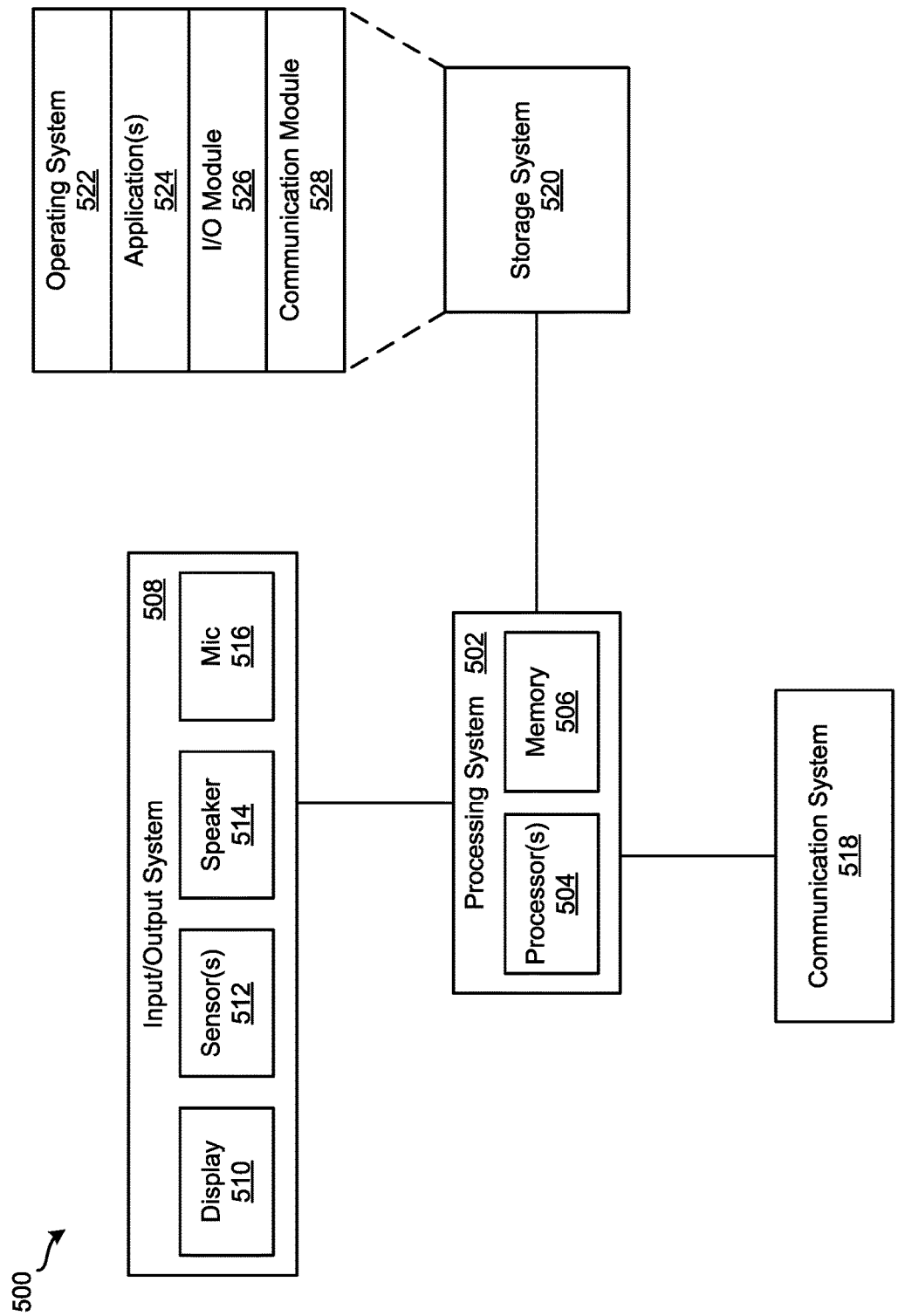
FIG. 5 illustrates an exemplary computing device, in which various embodiments may be implemented.

FIG. 5 illustrates an exemplary computing device 500 for implementing various embodiments described above. For example, computing device 500 may be used to implement client devices 105a-n. Computing device 500 may be a cellphone, a smartphone, a wearable device, an activity tracker or manager, a tablet, a personal digital assistant (PDA), a media player, or any other type of mobile computing device or combination thereof. As shown in FIG. 5, computing device 500 includes processing system 502, input/output (I/O) system 508, communication system 518, and storage system 520. These components may be coupled by one or more communication buses or signal lines.

Processing system 502, which can be implemented as one or more integrated circuits (e.g., a conventional microprocessor or microcontroller), controls the operation of computing device 500. As shown, processing system 502 includes one or more processors 504 and memory 506. Processors 504 are configured to run or execute various software and/or sets of instructions stored in memory 506 to perform various functions for computing device 500 and to process data.

Each processor of processors 504 may include one processing unit (e.g., a single core processor) or several processing units (e.g., a multicore processor). In some embodiments, processors 504 of processing system 502 may be implemented as independent processors while, in other embodiments, processors 504 of processing system 502 may be implemented as multiple processors integrate into a single chip. Still, in some embodiments, processors 504 of processing system 502 may be implemented as a combination of independent processors and multiple processors integrated into a single chip.

Memory 506 may be configured to receive and store software (e.g., operating system 522, applications 524, I/O module 526, communication module 528, etc. from storage system 520) in the form of program instructions that are loadable and executable by processors 504 as well as data generated during the execution of program instructions. In some embodiments, memory 506 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 508 is responsible for receiving input through various components and providing output through various components. As shown for this example, I/O system 508 includes display 510, one or more sensors 512, speaker 514, and microphone 516. Display 510 is configured to output visual information (e.g., a graphical user interface (GUI) generated and/or rendered by processors 504). In some embodiments, display 510 is a touch screen that is configured to also receive touch-based input. Display 510 may be implemented using liquid crystal display (LCD) technology, light-emitting diode (LED) technology, organic LED (OLED) technology, organic electro luminescence (OEL) technology, or any other type of display technologies. Sensors 512 may include any number of different types of sensors for measuring a physical quantity (e.g., temperature, force, pressure, acceleration, orientation, light, radiation, etc.). Speaker 514 is configured to output audio information and microphone 516 is configured to receive audio input. One of ordinary skill in the art will appreciate that I/O system 508 may include any number of additional, fewer, and/or different components. For instance, I/O system 508 may include a keypad or keyboard for receiving input, a port for transmitting data, receiving data and/or power, and/or communicating with another device or component, an image capture component for capturing photos and/or videos, etc.

Communication system 518 serves as an interface for receiving data from, and transmitting data to, other devices, computer systems, and networks. For example, communication system 518 may allow computing device 500 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 518 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 518 may provide components configured for wired communication (e.g., Ethernet) in addition to or instead of components configured for wireless communication.

Storage system 520 handles the storage and management of data for computing device 500. Storage system 520 may be implemented by one or more non-transitory machine-readable mediums that are configured to store software (e.g., programs, code modules, data constructs, instructions, etc.) and store data used for, or generated during, the execution of the software.

In this example, storage system 520 includes operating system 522, one or more applications 524, I/O module 526, and communication module 528. Operating system 522 includes various procedures, sets of instructions, software components and/or drivers for controlling and managing general system tasks (e.g., memory management, storage device control, power management, etc.) and facilitates communication between various hardware and software components. Operating system 522 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 524 can include any number of different applications installed on computing device 500. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 526 manages information received via input components (e.g., display 510, sensors 512, and microphone 516) and information to be outputted via output components (e.g., display 510 and speaker 514). Communication module 528 facilitates communication with other devices via communication system 518 and includes various software components for handling data received from communication system 518.

One of ordinary skill in the art will realize that the architecture shown in FIG. 5 is only an example architecture of computing device 500, and that computing device 500 may have additional or fewer components than shown, or a different configuration of components. The various components shown in FIG. 5 may be implemented in hardware, software, firmware or any combination thereof, including one or more signal processing and/or application specific integrated circuits.

Figure 6:
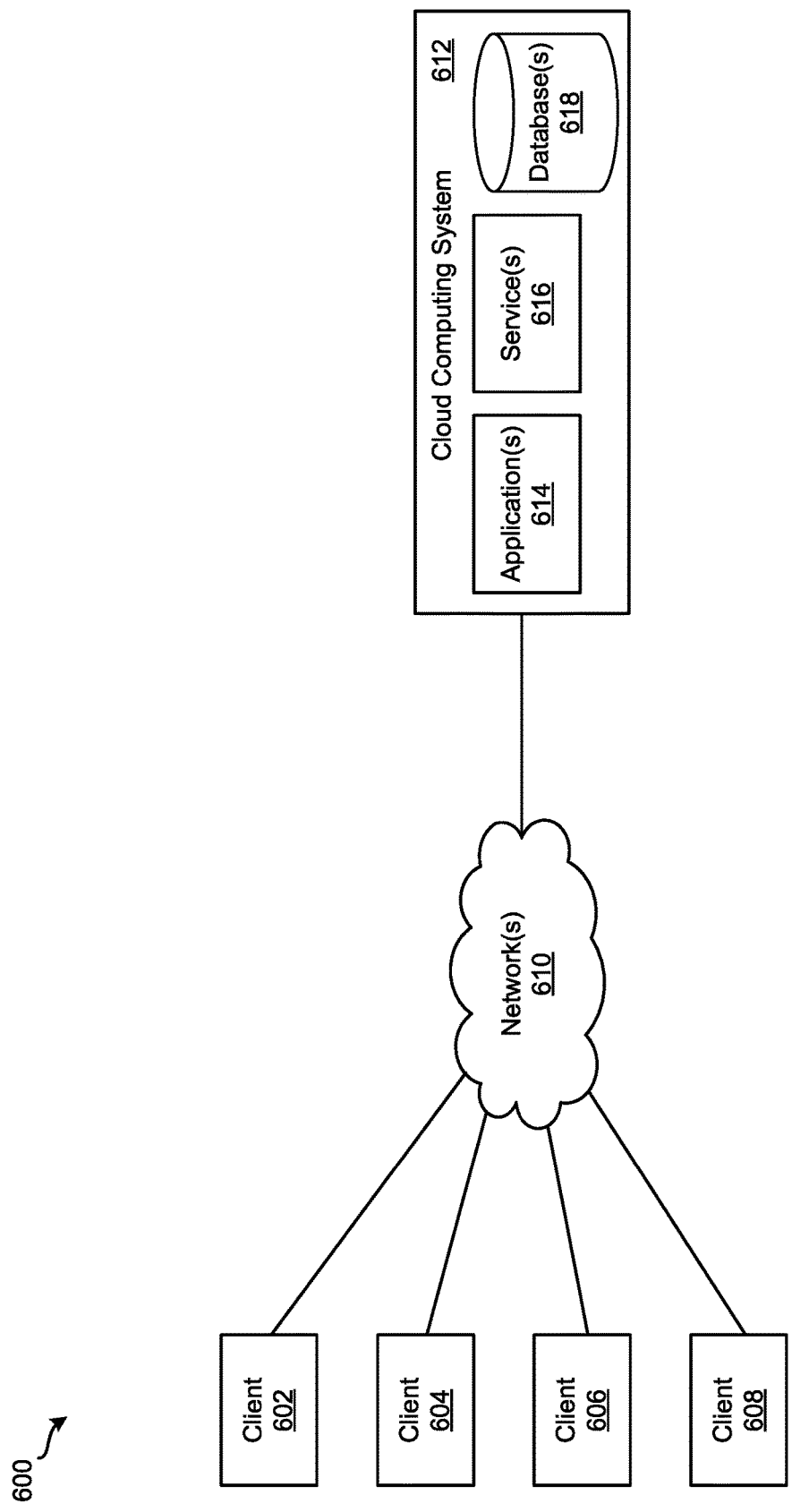
FIG. 6 illustrates an exemplary system, in which various embodiments may be implemented.

FIG. 6 illustrates an exemplary system 600 for implementing various embodiments described above. For example, client devices 602-608 may be used to implement client devices 105*a-n* and cloud computing system 612 may be used to implement computing system 110. As shown, system 600 includes client devices 602-608, one or more networks 610, and cloud computing system 612. Cloud computing system 612 is configured to provide resources and data to client devices 602-608 via networks 610. In some embodiments, cloud computing system 600 provides resources to any number of different users (e.g., customers, tenants, organizations, etc.). Cloud computing system 612 may be implemented by one or more computer systems (e.g., servers), virtual machines operating on a computer system, or a combination thereof.

As shown, cloud computing system 612 includes one or more applications 614, one or more services 616, and one or more databases 618. Cloud computing system 600 may provide applications 614, services 616, and databases 618 to any number of different customers in a self-service, subscription-based, elastically scalable, reliable, highly available, and secure manner.

In some embodiments, cloud computing system 600 may be adapted to automatically provision, manage, and track a customer's subscriptions to services offered by cloud computing system 600. Cloud computing system 600 may provide cloud services via different deployment models. For example, cloud services may be provided under a public cloud model in which cloud computing system 600 is owned by an organization selling cloud services and the cloud services are made available to the general public or different industry enterprises. As another example, cloud services may be provided under a private cloud model in which cloud computing system 600 is operated solely for a single organization and may provide cloud services for one or more entities within the organization. The cloud services may also be provided under a community cloud model in which cloud computing system 600 and the cloud services provided by cloud computing system 600 are shared by several organizations in a related community. The cloud services may also be provided under a hybrid cloud model, which is a combination of two or more of the aforementioned different models.

In some instances, any one of applications 614, services 616, and databases 618 made available to client devices 602-608 via networks 610 from cloud computing system 600 is referred to as a "cloud service." Typically, servers and systems that make up cloud computing system 600 are different from the on-premises servers and systems of a customer. For example, cloud computing system 600 may host an application and a user of one of client devices 602-608 may order and use the application via networks 610.

Applications 614 may include software applications that are configured to execute on cloud computing system 612 (e.g., a computer system or a virtual machine operating on a computer system) and be accessed, controlled, managed, etc. via client devices 602-608. In some embodiments, applications 614 may include server applications and/or mid-tier applications (e.g., HTTP (hypertext transport protocol) server applications, FTP (file transfer protocol) server applications, CGI (common gateway interface) server applications, JAVA server applications, etc.). Services 616 are software components, modules, application, etc. that are configured to execute on cloud computing system 612 and provide functionalities to client devices 602-608 via networks 610. Services 616 may be web-based services or on-demand cloud services.

Databases 618 are configured to store and/or manage data that is accessed by applications 614, services 616, and/or client devices 602-608. For instance, storages 130-140 may be stored in databases 618. Databases 618 may reside on a non-transitory storage medium local to (and/or resident in) cloud computing system 612, in a storage-area network (SAN), on a non-transitory storage medium local located remotely from cloud computing system 612. In some embodiments, databases 618 may include relational databases that are managed by a relational database management system (RDBMS). Databases 618 may be a column-oriented databases, row-oriented databases, or a combination thereof. In some embodiments, some or all of databases 618 are in-memory databases. That is, in some such embodiments, data for databases 618 are stored and managed in memory (e.g., random access memory (RAM)).

Client devices 602-608 are configured to execute and operate a client application (e.g., a web browser, a proprietary client application, etc.) that communicates with applications 614, services 616, and/or databases 618 via networks 610. This way, client devices 602-608 may access the various functionalities provided by applications 614, services 616, and databases 618 while applications 614, services 616, and databases 618 are operating (e.g., hosted) on cloud computing system 600. Client devices 602-608 may be computer system 400 or computing device 500, as described above by reference to FIGS. 4 and 5, respectively. Although system 600 is shown with four client devices, any number of client devices may be supported.

Networks 610 may be any type of network configured to facilitate data communications among client devices 602-608 and cloud computing system 612 using any of a variety of network protocols. Networks 610 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:
   receiving from a client device a request specifying a plurality of variables comprising set of sources and a set of objects;
   receiving a set of values from the set of sources, each value in the set of values specifying an object in set of objects;
   receiving a selection of a set of defined scenarios for the request and the set of values;
   generating a set of linear programming models based on the set of defined scenarios, the request, and the set of values;
   instructing a set of solvers to solve the set of linear programming models; and
   providing the client device with a set of results received from the set of solvers.

2. The non-transitory machine-readable medium of claim 1, wherein the program further comprises sets of instructions for:
   identifying an outlier value in the set of values; and
   removing the outlier value from the set of values,
   wherein generating the set of linear programming models comprises generating the set of linear programming models further based on values in the set of values other than the outlier value.

3. The non-transitory machine-readable medium of claim 1, wherein the program further comprises a set of instructions for, for each programming model in the set of linear programming models, performing complexity analysis on the linear programming model by:
   determining whether a number of variables in the plurality of variables is greater than a defined threshold value;
   upon determining that the number of variables in the plurality of variables is greater than the defined threshold value, determining that the linear programming model is a complex linear programming model; and
   upon determining that the number of variables in the plurality of variables is not greater than the defined threshold value, determining that the linear programming model is a non-complex linear programming model.

4. The non-transitory machine-readable medium of claim 3, wherein the program further comprises a set of instructions for, for each programming model in the set of linear programming models, identifying a solver from a plurality of solvers to use on the linear programming model based on the complexity analysis of the linear programming model by:
   upon determining that the linear programming model is a complex linear programming model, identifying a first solver from the plurality of solvers to use on the linear programming model; and
   upon determining that the linear programming model is a non-complex linear programming model, identifying a second, different solver from the plurality of solvers to use on the linear programming model.

5. The non-transitory machine-readable medium of claim 4, wherein instructing the set of solvers to solve the set of linear programming models comprises, for each programming model in the set of linear programming models, instructing the identified solver to solve the liner programming model by:
   upon determining that the linear programming model in the set of linear programming models is a non-complex linear programming model, storing the linear programming model in memory of the computing device and instructing the identified solver to solve the linear programming model from the memory; and
   upon determining that the linear programming model in the set of linear programming models is a complex linear programming model, generating a file configured to store the linear programming model; storing the file in a storage, and instructing the identified solver to solve the linear programming model from the storage.

6. The non-transitory machine-readable medium of claim 1, wherein the program further comprises a set of instructions for receiving a set of constraints for the set of defined scenarios, wherein generating the set of linear programming models is further based on the set of constraints.

7. The non-transitory machine-readable medium of claim 1, wherein a scenario in the set of scenarios specifies to determine an optimal subset of values from the set of values based on the plurality of variables and the set of values.

8. A method, executable by a device, comprising:
   receiving from a client device a request specifying a plurality of variables comprising set of sources and a set of objects;
   receiving a set of values from the set of sources, each value in the set of values specifying an object in set of objects;
   receiving a selection of a set of defined scenarios for the request and the set of values;
   generating a set of linear programming models based on the set of defined scenarios, the request, and the set of values;
   instructing a set of solvers to solve the set of linear programming models; and providing the client device with a set of results received from the set of solvers.

9. The method of claim 8 further comprising:
identifying an outlier value in the set of values; and
removing the outlier value from the set of values,
wherein generating the set of linear programming models comprises generating the set of linear programming models further based on values in the set of values other than the outlier value.

10. The method of claim 8 further comprising, for each programming model in the set of linear programming models, performing complexity analysis on the linear programming model by:
determining whether a number of variables in the plurality of variables is greater than a defined threshold value;
upon determining that the number of variables in the plurality of variables is greater than the defined threshold value, determining that the linear programming model is a complex linear programming model; and
upon determining that the number of variables in the plurality of variables is not greater than the defined threshold value, determining that the linear programming model is a non-complex linear programming model.

11. The method of claim 10 further comprising, for each programming model in the set of linear programming models, identifying a solver from a plurality of solvers to use on the linear programming model based on the complexity analysis of the linear programming model by:
upon determining that the linear programming model is a complex linear programming model, identifying a first solver from the plurality of solvers to use on the linear programming model; and
upon determining that the linear programming model is a non-complex linear programming model, identifying a second, different solver from the plurality of solvers to use on the linear programming model.

12. The method of claim 11, wherein instructing the set of solvers to solve the set of linear programming models comprises, for each programming model in the set of linear programming models, instructing the identified solver to solve the liner programming model by:
upon determining that the linear programming model in the set of linear programming models is a non-complex linear programming model, storing the linear programming model in memory of the computing device and instructing the identified solver to solve the linear programming model from the memory; and
upon determining that the linear programming model in the set of linear programming models is a complex linear programming model, generating a file configured to store the linear programming model; storing the file in a storage, and instructing the identified solver to solve the linear programming model from the storage.

13. The method of claim 8 further comprising receiving a set of constraints for the set of defined scenarios, wherein generating the set of linear programming models is further based on the set of constraints.

14. The method of claim 8, wherein a scenario in the set of scenarios specifies to determine an optimal subset of values from the set of values based on the plurality of variables and the set of values.

15. A system comprising:
a set of processing units; and
a non-transitory machine-readable medium storing instructions that when executed by at least one processing unit in the set of processing units cause the at least one processing unit to:
receive from a client device a request specifying a plurality of variables comprising set of sources and a set of objects;
receive a set of values from the set of sources, each value in the set of values specifying an object in set of objects;
receive a selection of a set of defined scenarios for the request and the set of values;
generate a set of linear programming models based on the set of defined scenarios, the request, and the set of values;
instruct a set of solvers to solve the set of linear programming models; and
provide the client device with a set of results received from the set of solvers.

16. The system of claim 15, wherein the instructions further cause the at least one processing unit to:
identify an outlier value in the set of values; and
remove the outlier value from the set of values,
wherein generating the set of linear programming models comprises generating the set of linear programming models further based on values in the set of values other than the outlier value.

17. The system of claim 15, wherein the instructions further cause the at least one processing unit to, for each programming model in the set of linear programming models, perform complexity analysis on the linear programming model by:
determining whether a number of variables in the plurality of variables is greater than a defined threshold value;
upon determining that the number of variables in the plurality of variables is greater than the defined threshold value, determining that the linear programming model is a complex linear programming model; and
upon determining that the number of variables in the plurality of variables is not greater than the defined threshold value, determining that the linear programming model is a non-complex linear programming model.

18. The system of claim 17, wherein the instructions further cause the at least one processing unit to, for each programming model in the set of linear programming models, identify a solver from a plurality of solvers to use on the linear programming model based on the complexity analysis of the linear programming model by:
upon determining that the linear programming model is a complex linear programming model, identifying a first solver from the plurality of solvers to use on the linear programming model; and
upon determining that the linear programming model is a non-complex linear programming model, identifying a second, different solver from the plurality of solvers to use on the linear programming model.

19. The system of claim 18, wherein instructing the set of solvers to solve the set of linear programming models comprises, for each programming model in the set of linear programming models, instructing the identified solver to solve the liner programming model by:
upon determining that the linear programming model in the set of linear programming models is a non-complex linear programming model, storing the linear programming model in memory of the computing device and instructing the identified solver to solve the linear programming model from the memory; and upon determining that the linear programming model in the set of linear programming models is a complex linear programming model, generating a file configured to store the linear programming model; storing the file in a storage, and instructing the identified solver to solve the linear programming model from the storage.

20. The system of claim 15, wherein the instructions further cause the at least one processing unit to receive a set of constraints for the set of defined scenarios, wherein generating the set of linear programming models is further based on the set of constraints.

* * * * *